US012654666B2

(12) United States Patent
Michaelsen et al.

(10) Patent No.: US 12,654,666 B2
(45) Date of Patent: Jun. 16, 2026

(54) BRAKE SYSTEM, METHOD FOR OPERATING THE BRAKE SYSTEM, AND VEHICLE

(71) Applicant: ZF CV Systems Global GmbH, Bern (CH)

(72) Inventors: Arne Michaelsen, Seelze (DE); Robert Otremba, Ronnenberg (DE); Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 99 days.

(21) Appl. No.: 18/798,578

(22) Filed: Aug. 8, 2024

(65) Prior Publication Data

US 2024/0400019 A1 Dec. 5, 2024

Related U.S. Application Data

(63) Continuation of application No. PCT/EP2023/050278, filed on Jan. 9, 2023.

(30) Foreign Application Priority Data

Feb. 22, 2022 (DE) ..................... 10 2022 104 073.9

(51) Int. Cl.
B60T 8/96 (2006.01)
B60T 8/171 (2006.01)
(Continued)

(52) U.S. Cl.
CPC ............... B60T 8/96 (2013.01); B60T 8/171 (2013.01); B60T 8/172 (2013.01); B60T 8/58 (2013.01);
(Continued)

(58) Field of Classification Search
CPC .... B60T 13/662; B60T 17/18; B60T 2240/00; B60T 2270/402; B60T 2270/413;
(Continued)

(56) References Cited

U.S. PATENT DOCUMENTS 12,030,477 B2 * 7/2024 Subramanian ........ B60T 8/1708
2016/0009259 A1 1/2016 Joyce et al.
(Continued)

FOREIGN PATENT DOCUMENTS

DE 10 2008 003 381 A1 7/2009
DE 10 2015 110 965 A1 1/2016
(Continued)

OTHER PUBLICATIONS

251117 DE 11 2016 005158 Nikishin Google machine translation (Year: 2016).*
(Continued)

*Primary Examiner* — Carl C Staubach
(74) *Attorney, Agent, or Firm* — Walter Ottesen, P.A.

(57) ABSTRACT

A brake system is for the electronically controlled braking of wheels on at least two main axles. The system includes wheel speed sensors on the main axles and on at least one additional axle to output wheel speed signals and two control devices for generating and outputting brake signals. The wheel brakes on the main axles can be controlled according to the brake signals. The sensors on the main axles are connected to the control devices via main data lines such that each control device for each wheel on the main axles, which is assigned a wheel speed sensor, can receive a determined wheel speed via the wheel speed signals. Each wheel speed sensor on at least one additional axle is connected only to one of the control devices via an additional data line. Each control device is connected to at least one of the sensors on the additional axle.

21 Claims, 2 Drawing Sheets

(51) Int. Cl.

| | |
|---|---|
| *B60T 8/172* | (2006.01) |
| *B60T 8/58* | (2006.01) |
| *B60T 8/88* | (2006.01) |
| *B62D 61/12* | (2006.01) |

(52) U.S. Cl.

CPC ........... *B60T 8/885* (2013.01); *B60T 2240/00* (2013.01); *B60T 2270/402* (2013.01); *B60T 2270/413* (2013.01); *B62D 61/125* (2013.01)

(58) Field of Classification Search

CPC . B60T 8/171; B60T 8/172; B60T 8/58; B60T 8/885; B60T 8/96

See application file for complete search history.

(56) References Cited

U.S. PATENT DOCUMENTS

| | | | | |
|---|---|---|---|---|
| 2016/0311419 | A1 | 10/2016 | Joyce et al. | |
| 2019/0184950 | A1* | 6/2019 | Williams | ................ B60T 17/22 |
| 2020/0086709 | A1* | 3/2020 | Tagesson | ........... B60G 17/0525 |
| 2020/0254986 | A1 | 8/2020 | Goers et al. | |
| 2021/0221344 | A1 | 7/2021 | Michaelsen | |
| 2022/0055583 | A1 | 2/2022 | Michaelsen | |
| 2022/0185251 | A1* | 6/2022 | Schmidt | ................ B60T 13/683 |
| 2025/0206282 | A1* | 6/2025 | van Thiel | .............. B60T 13/683 |
| 2025/0289402 | A1* | 9/2025 | Bieber | .................. B60T 8/1766 |
| 2025/0304033 | A1* | 10/2025 | Bieber | ............. B60W 50/0097 |

FOREIGN PATENT DOCUMENTS

| | | |
|---|---|---|
| DE | 10 2016 006 763 A1 | 12/2017 |
| DE | 11 2016 005 158 T5 | 9/2018 |
| DE | 10 2017 005 071 A1 | 11/2018 |
| DE | 10 2019 106 243 A1 | 9/2020 |
| DE | 10 2019 114 270 A1 | 12/2020 |
| EP | 2 755 039 A1 | 7/2014 |

OTHER PUBLICATIONS

International Search Report of the European Patent Office dated Apr. 17, 2023 for international application PCT/EP2023/050278 on which this application is based.

English translation and Written Opinion of the International Searching Authority dated Apr. 17, 2023 for international application PCT/EP2023/050278 on which this application is based.

* cited by examiner

BRAKE SYSTEM, METHOD FOR OPERATING THE BRAKE SYSTEM, AND VEHICLE

CROSS-REFERENCE TO RELATED APPLICATIONS

This application is a continuation application of international patent application PCT/EP2023/050278, filed Jan. 9, 2023, designating the United States and claiming priority from German application 10 2022 104 073.9, filed Feb. 22, 2022, and the entire content of both applications is incorporated herein by reference.

TECHNICAL FIELD

The disclosure relates to a brake system for a vehicle, in particular a commercial vehicle, to a method for operating the brake system, and to a vehicle, in particular a commercial vehicle, having the brake system.

BACKGROUND

In vehicles, in particular commercial vehicles with a higher degree of automation, in particular level 3 or higher, it has been found that an improved or extended diagnostic option should be provided if a driver monitoring driving operation and monitoring the functionalities of the vehicle or commercial vehicle is no longer present. A number of sensors and control units have already been installed in the vehicle, with the result that further control units, in particular, take up additional installation space and also increase the incorporation expenditure and the costs.

Brake systems, in particular electronic brake systems (EBS), generally have, for example, a central first control unit which, during normal operation, outputs electrical brake control signals which can be taken as a basis for controlling brake pressures on wheel brakes on a front and a rear main axle of the vehicle. In this case, the use of a second control unit is sometimes provided, which second control unit can maintain alternative or at least rudimentary braking operation in the event of a fault in the central first control unit, which is also referred to as a fail operation braking system (FOBS). During normal operation of the brake system, the first control unit can generally carry out braking operation together with driving dynamics control operations via the individual wheel brakes on the main axles. In the event of a fault or during backup operation of the brake system, driving dynamics control operations are at least restricted or no longer possible. This is described, by way of example, in US 2022/0185251.

In order to be able to carry out braking operation from driving dynamics points of view in the respective operating modes, the control units resort, in particular, to wheel speed signals from wheel speed sensors assigned to the brakable wheels of the main axle. In this case, there are various wiring options between the wheel speed sensors and the respective control unit, for example branched wiring via a Y connection, as shown by way of example in US 2020/0254986, or unbranched direct wiring. US 2021/0221344 also describes the practice of connecting a plurality of speed sensors via a plurality of terminals to an axle modulator that evaluates the wheel speed signals and has an internal control unit.

SUMMARY

It is an object of the disclosure to specify a brake system and a method for operating the brake system, which can be used to easily ensure safe driving operation in a vehicle operated in an automated manner. The object is also to specify a vehicle.

This object is, for example, achieved via a brake system for the electronically controlled braking of wheels on at least two main axles of a vehicle via wheel brakes of the brake system. The brake system includes: a plurality of wheel speed sensors, wherein the at least two main axles and at least one additional axle have at least one of the plurality of wheel speed sensors disposed thereon for outputting wheel speed signals on a basis of determined wheel speeds of the wheels on the at least two main axles and of the wheels on the at least one additional axle; at least two control units for generating and outputting brake control signals, wherein the wheel brakes on the at least two main axles are configured to be controlled on a basis of the brake control signals; the wheel speed sensors on the at least two main axles being connected to the at least two control units via main data lines such that each of the at least two control units is configured to receive the determined wheel speeds via the wheel speed signals for each wheel on the at least two main axles to which at least one wheel speed sensor is assigned; and, each of the wheel speed sensors on the at least one additional axle being connected only to one of the at least two control units via an additional data line, and each of the at least two control units is in turn connected to at least one of the wheel speed sensors on the at least one additional axle.

The object is, for example, also achieved via a method for operating a brake system, the brake system being for electronically controlled braking of wheels on at least two main axles of a vehicle via wheel brakes of the brake system. The brake system includes a plurality of wheel speed sensors and at least two control units for generating and outputting brake control signals, the at least two main axles and at least one additional axle have at least one of the plurality of wheel speed sensors disposed thereon for outputting wheel speed signals on a basis of determined wheel speeds of the wheels on the at least two main axles and of the wheels on the at least one additional axle, the wheel brakes on the at least two main axles being configured to be controlled on a basis of the brake control signals, the wheel speed sensors on the at least two main axles being connected to the at least two control units via main data lines such that each of the at least two control units is configured to receive the determined wheel speeds via the wheel speed signals for each wheel on the at least two main axles to which at least one wheel speed sensor is assigned, and, each of the wheel speed sensors on the at least one additional axle being connected only to one of the at least two control units via an additional data line, and each of the at least two control units is in turn connected to at least one of the wheel speed sensors on the at least one additional axle. The method includes: generating and outputting the brake control signals via the at least two control units of the brake system; controlling the wheel brakes on the at least two main axles on a basis of the outputted brake control signals; outputting the wheel speed signals via the wheel speed sensors on the at least two main axles and on the at least one additional axle of the brake system, wherein the wheel speed signals are generated on a basis of the determined wheel speeds of the wheels on the at least two main axles and of the wheels on the at least one additional axle; receiving at each of the at least two control units the determined wheel speed via the output wheel speed signals for each wheel on the at least two main axles, to which at least one of the wheel speed sensors is assigned, and the at least two control units being configured to generate brake control signals on a basis thereof; and, receiving and processing via each of the at least two control units the determined wheel speeds of at least one of the wheels on the at least one additional axle via the output wheel speed signals, wherein each determined wheel speed of the wheel on the at least one additional axle is simultaneously received and processed only by one of the at least two control units.

Accordingly, the disclosure provides a brake system for the electronically controlled braking of wheels on at least two main axles of a vehicle via wheel brakes of the brake system, wherein the brake system at least has:

wheel speed sensors (active or passive) on the at least two main axles and on at least one further, additional axle for outputting wheel speed signals on the basis of determined wheel speeds of the breakable wheels on the at least two main axles and of the wheels on the at least one additional axle, that is, the brakable wheels of the at least two main axles and the wheels of the at least one additional axle are each assigned at least one wheel speed sensor, and at least two (brake) control units for generating and outputting brake control signals, wherein the wheel brakes on the at least two main axles can be controlled on the basis of the brake control signals, for example using an axle modulator or a pressure control module or a comparable module that is able to provide a corresponding brake pressure for the wheels of the respective vehicle axle on the basis of the brake control signals, wherein the wheel speed sensors on the at least two main axles, which are assigned to the respective brakable wheels of the at least two main axles, have a signal-conducting connection to the at least two control units via main data lines in such a manner that each control unit can receive a determined wheel speed (or, with the same effect, a variable dependent thereon) via the wheel speed signals for each wheel on the at least two main axles, to which at least one wheel speed sensor is assigned, and wherein each wheel speed sensor on the at least one additional axle, which is assigned to the respective wheels of the at least one additional axle, is respectively connected only to one of the at least two control units via an additional data line, and each control unit is in turn connected to at least one of the wheel speed sensors on the at least one additional axle.

The disclosure also provides a method for operating the brake system and a vehicle having the brake system. In the context of the disclosure, a main axle should be understood as meaning a vehicle axle of the vehicle, the wheels of which can be braked, wherein this main axle is also used to ensure stable driving operation by virtue of brake pressure adjustments being carried out on this main axle in "critical" situations from driving dynamics points of view, for example during ABS control, ASR control, ESC control or similar stability control operations. The control units are configured, in particular, to generate the brake control signals for the wheel brakes on the basis of the wheel speed signals from the wheel speed sensors on the main axles. In this case, a wheel brake is preferably assigned to all wheels of the at least two main axles for the purpose of braking the wheels of the at least two main axles of the vehicle in a wheel-by-wheel manner. No driving dynamics adjustment of a brake pressure is generally carried out on the additional axle that is "non-critical" in contrast; it is therefore used only for support, for example as a concomitantly rolling, supporting vehicle axle, in particular a lift axle, wherein the additional axle generally cannot or must not necessarily be actively braked via wheel brakes during driving operation.

The disclosure therefore already achieves the advantage that there is an extended diagnostic option using the wheel speed behavior of the additional axle. The wheel end can therefore be monitored on the basis of the wheel speeds captured at the additional axle and the functionality of individual components of the vehicle associated therewith can be checked thereby, which was previously not carried out in this manner. The functionality of the brake system for the main axles can advantageously also be subjected to a plausibility check or checked by evaluating the wheel speeds at the additional axle if, for example, a fault in the main axle controller occurs on account of a common cause fault. This can be determined by evaluating the wheel speeds at the additional axles, for example by comparing the wheel speed signals respectively transmitted by the main axle and the additional axles.

Resorting to the control units of the brake system means that the installation effort and the costs are low since no additional control units need to be used. In this case, the control units used are already configured to receive and process the wheel speed signals from wheel speed sensors, with the result that the control units need to be adapted only slightly and corresponding additional data lines to the further wheel speed sensors on the additional axle need to be laid, wherein the additional data lines preferably connect the respective wheel speed sensor to the respective control unit in a directly wired manner.

Since the wheel speed sensors on the at least one additional axle are also divided among the control units, optimized wiring to the respective nearest control unit can be selected and, in the event of a fault, the respective other control unit can at least still read the wheel speed sensors connected to it and can carry out diagnostic functions on the basis thereof. Dividing the wheel speed sensors of the at least one additional axle among the two control units also makes it possible to minimize the number of (additional) terminals for each control unit. In this case, provision may preferably also be made for the at least two control units to have a signal-conducting connection to one another via an exchange data line for the purpose of exchanging signals relating to the wheel speeds, in particular of the at least one additional axle. This makes it possible for both control units to resort to the additional wheel speed information during normal operation, in which case one of the control units can be selected as the primary operating control unit.

Provision may therefore preferably be made for the at least two control units of the brake system to be formed by a primary control unit and a secondary control unit, wherein the primary control unit is configured to generate and output primary brake control signals during normal operation of the brake system, for example on the basis of the determined and received wheel speeds of the wheels of the at least two main axles, and the secondary control unit is configured to generate and output secondary brake control signals during backup operation of the brake system, in which the primary control unit has failed, that is, has a defect or a malfunction, for example likewise on the basis of the determined and received wheel speeds of the wheels of the at least two main axles, wherein the wheel brakes of the brake system can be controlled on the basis of the primary brake control signals during normal operation and can be controlled on the basis of the secondary brake control signals during backup operation.

Accordingly, two coordinating control units are provided in the brake system and can step in for one another depending on the functionality in order to provide a so-called "fail operation braking system (FOBS)". This is then developed such that the two control units can also monitor the additional axles (accordingly divided among one another) in a parallel manner and can accordingly receive and forward or further process the wheel speed signals among one another, preferably in a uniformly divided manner. If the primary control unit fails, if the wheel speed sensors are uniformly divided, the secondary control unit which is respectively still functioning can still receive and evaluate the wheel speeds of the wheel speed sensor assigned to it on the additional axle, with the result that there is still the possibility of additional monitoring even in the event of a fault.

Provision is preferably also made for at least two additional axles (that is, at least a four-axle vehicle) to be provided in the brake system, wherein the wheel speed sensors on the at least two additional axles are uniformly divided among the at least two control units, for example in such a manner that each of the at least two control units is connected to the same number of wheel speed sensors on the at least two additional axles via the additional data lines, for example in an axle-by-axle or wheel-by-wheel manner (for example in the case of an uneven number of additional axles), without one of the wheel speed sensors on the at least one additional axle being connected to more than one of the at least two control units. In this manner, in the event of a fault, the second control unit can still resort to half (in the case of an even number of additional axles) of the additional wheel speed sensors on the additional axles and each control unit then ideally has to provide the same number of additional terminals for receiving the wheel speed signals or for connecting the additional data lines.

Provision is also preferably made for the wheel speed sensors assigned to the same additional axle to be connected to the same control unit via the additional data lines, that is, an axle-by-axle assignment or division among the at least two control units is advantageously selected, and/or at least some of the wheel speed sensors assigned to the same additional axle are connected to different control units via the additional data lines for the purpose of dividing at least some of the wheel speed sensors among the at least two control units in a wheel-by-wheel manner.

Provision is preferably also made for at least one of the control units, preferably the primary control unit with primary operation during normal operation in the case of an FOBS configuration of the brake system, to be configured to monitor an additional axle status on the basis of the wheel speed signals from the wheel speed sensors on the at least one additional axle, wherein the additional axle status indicates whether the additional axle is being operated in a faulty or fault-free manner. Accordingly, the wheel end can be diagnosed via the wheel rotation behavior of the additional axles, that is, whether the wheel-side end of the at least one additional axle behaves as expected.

For this purpose, provision may be made, for example, for the at least one additional axle to be formed by a lift axle of the vehicle, wherein the lift axle can be raised and lowered via a lift axle controller, for example on the basis of the load, wherein at least one of the control units is configured to monitor a lift axle status by checking the plausibility of the setting of the lift axle controller on the basis of the wheel speed signals output by the wheel speed sensors on the lift axle. Monitoring the wheel speeds then makes it possible to determine, for example, whether raising or lowering of the lift axle that is requested via the lift axle controller is actually implemented, which would be reflected in that case by wheel speeds not equal to zero or of zero.

Provision may also be made, for example, for at least one of the control units to be configured to check, on the basis of the wheel speed signals output by the wheel speed sensors on the additional axle, whether a wheel speed of the wheels on the additional axle corresponds to or differs from a target wheel speed, in order to determine whether the additional axle is being operated in a faulty or fault-free manner. This makes it possible to determine an impairment in the wheel rotation behavior, for example on account of a burst tire, a sticking brake or other defects in the wheel end of the additional axle, wherein the wheel speeds of other wheels on other axles (other additional axle or main axles) of the vehicle can be used to a good approximation as the target wheel speed, for example.

Provision is preferably also made for the at least two control units to each have main terminals for connecting a wheel speed sensor on a main axle and additional terminals for connecting a wheel speed sensor on an additional axle, wherein each wheel speed sensor connected to the respective control unit via the main data line is respectively connected to its own or a separate main terminal of the respective control unit and/or is assigned its own or a separate main terminal on the respective control unit, and each wheel speed sensor connected to the respective control unit via the additional data line is respectively connected to its own or a separate additional terminal of the respective control unit and/or is assigned its own or a separate additional terminal on the respective control unit.

Accordingly, separate terminals can be provided for the respective wheel speed sensors in order to ensure, in particular, a separate or independent voltage supply and/or signal transmission. This enables electrical decoupling, with the result that different wheel speed sensors do not influence one another during reading and/or energy supply.

Provision is preferably also made for the main data lines to each have a branching Y connection such that a wheel speed sensor arranged on the at least two main axles is simultaneously connected to the at least two control units via the respective Y connection and via the respective main terminals. A wheel speed sensor can therefore be read by at least two control units, thus making it possible to save sensors. Alternatively, provision may also be made for a wheel speed sensor arranged on the at least two main axles to be connected to the respective control unit via the respective main terminal in a directly wired manner via the respective main data line, wherein two wheel speed sensors are respectively assigned to each wheel on the at least two main axles and each of the two wheel speed sensors of a wheel is connected to another control unit in a directly wired manner via the main data line. It is therefore also possible to provide a redundant configuration, thus making it possible to exclude mutual influence during reading and/or the supply of energy for each wheel via the respective control unit in the normal case, with the result that the wheel speeds of a wheel can be read at the same time in an electrically decoupled manner.

One embodiment also provides for the at least two control units to be parameterizable and to be configured to respectively switch between a first operating mode and a second operating mode for each main terminal and for each additional terminal, wherein there is or can be a switch to the first operating mode if the respective main terminal or additional terminal of a control unit is connected to a wheel speed sensor via a Y connection, and there is or can be a switch to the second operating mode if the respective main terminal or additional terminal of a control unit is connected to a wheel speed sensor in a directly wired manner.

This enables variable operation of the respective control unit since hardware components and software routines in the respective control unit can be activated or deactivated depending on whether they are actually needed. In the case of a branching Y connection, it is necessary to coordinate the control units via a corresponding software routine and the respective active control unit uses hardware components other than the inactive control unit to read and/or supply energy to the respective relevant wheel speed sensor. In contrast, in the case of direct wiring, such coordination is not required. This configuration of the control unit is not necessarily limited to it receiving and processing wheel speed signals from additional axles and/or there being direct wiring between the wheel speed sensors on the additional axle and the respective control unit.

Provision is preferably also made for the at least two control units to have a signal-conducting connection to one another via an exchange data line for the purpose of exchanging signals relating to the wheel speeds, in particular of the at least one additional axle. During normal operation, the two control units can therefore coordinate and the wheel speed signals from the additional axle can be centrally processed in only one of the control units, preferably the primary control unit.

BRIEF DESCRIPTION OF DRAWINGS

The invention will now be described with reference to the drawings wherein.

DETAILED DESCRIPTION

Figure 1:
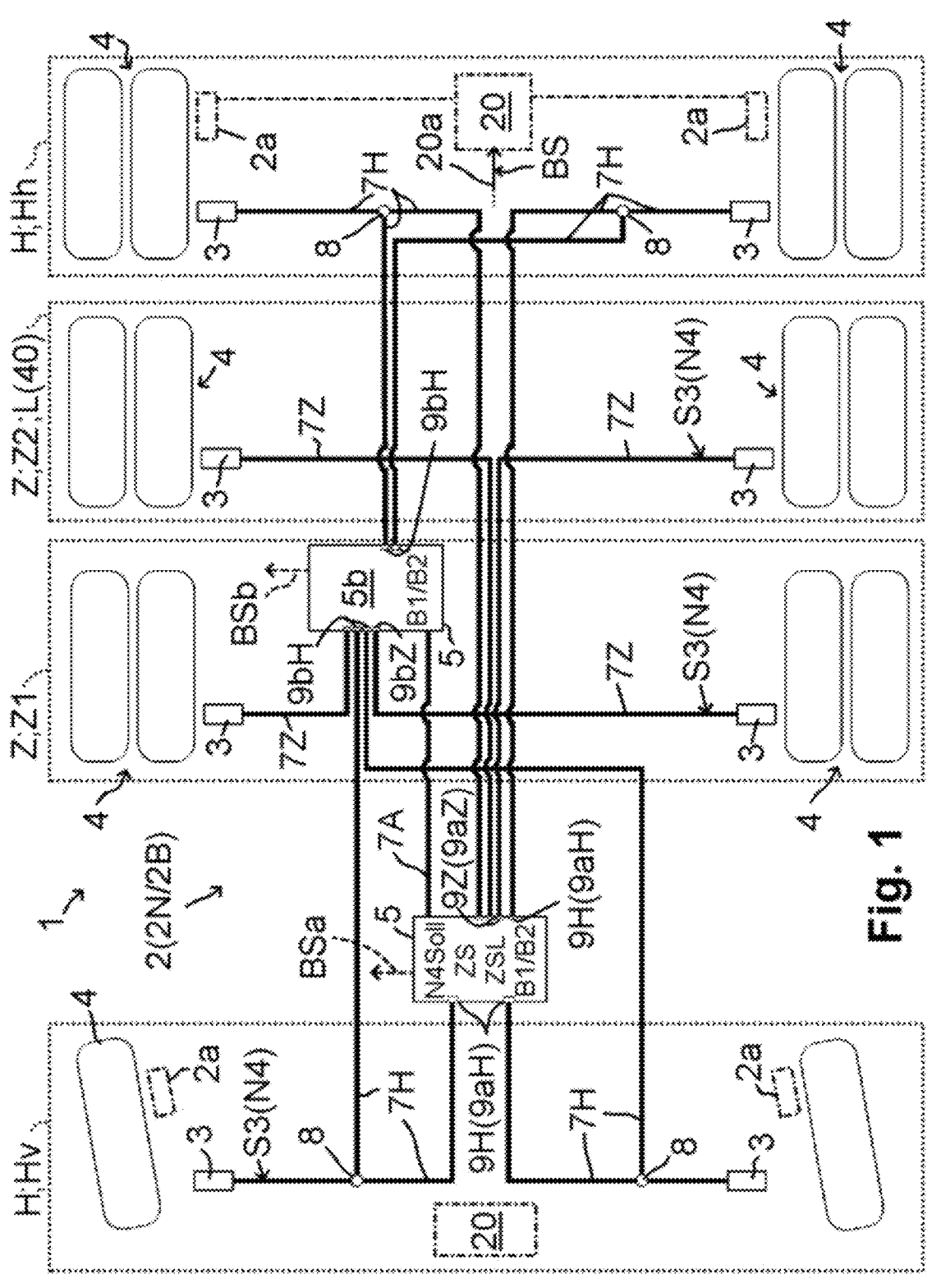
FIG. 1 shows a schematic view of a four-axle vehicle.
Figure 2:
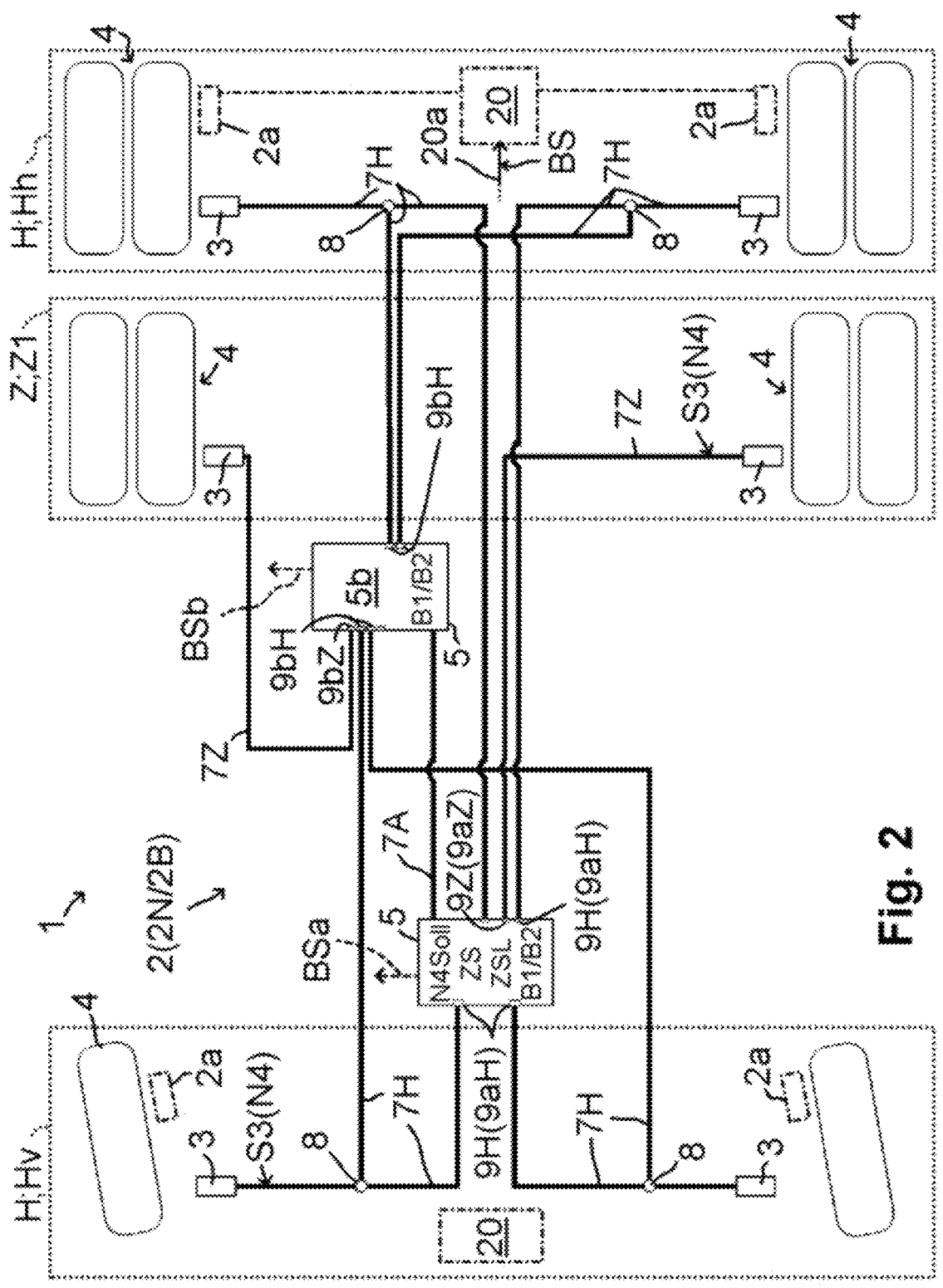
FIG. 2 shows a schematic view of a three-axle vehicle.

FIGS. 1 and 2 schematically show a vehicle 1 having a brake system 2 with wheel brakes 2a and wheel speed sensors 3 on the individual wheels 4. In this case, the wheel speed sensors 3 can be actively or passively operated. The wheel speed sensors 3 are assigned to the individual wheels 4 of two main axles H of the vehicle 1, a steerable front main axle Hv and a rear main axle Hh, and to at least one additional axle Z, a first additional axle Z1 and a second additional axle Z2 in FIG. 1 and only a first additional axle Z1 in FIG. 2, that is, they measure a wheel speed N4 of the respectively assigned wheel 4 on the respective main axle H or additional axle Z.

On the basis of the measured wheel speeds N4 of the wheels 4 of the main axles H, brake pressures which are adjusted to the individual wheel brakes 2a on the wheels 4 of the main axles H can be specified or adapted from driving dynamics points of view, for example as part of ABS control, ASR control or ESC control. In the present case, this is ensured using two control units 5 of the brake system 2, a primary control unit 5a and a secondary control unit 5b, wherein the primary control unit 5a is used during normal operation 2N of the brake system 2 and the secondary control unit 5b is used during backup operation 2B of the brake system 2 in the event of a fault.

Each of the control units 5 is able to monitor the brake system 2 and to generate and output brake control signals BS (5a: primary brake control signals BSa, 5b: secondary brake control signals BSb) on the basis of input signals, in particular wheel speed signals S3 from the wheel speed sensors 3 or automated braking specifications and signals from further sensors. The brake control signals BS may include, for example, target brake pressures or related variables which are determined by the respective control unit 5 during normal operation 2N or during backup operation 2B. The wheel brakes 2a on the respective main axle H are then controlled on the basis of these brake control signals BS, that is, via the primary brake control signals BSa during normal operation 2N and via the secondary brake control signals BSb during backup operation 2B. The control units 5 may each control axle modulators 20 (pressure control module) assigned to the main axles H using the respectively generated and output brake control signals BS via control lines 20a, wherein the axle modulators 20 are each configured to adjust a brake pressure specified via the brake control signals BS to the wheel brakes 2a of the respective main axle H.

For such wheel-speed-based control of the respective wheel brakes 2a, the control units 5 are connected to the wheel speed sensors 3 on the two main axles H via main data lines 7H in order to make it possible to transmit the wheel speed signals S3 and to also ensure that the wheel speed sensors 3 are supplied with energy by the respective control unit 5, for example in the case of actively operated wheel speed sensors 3. According to the embodiment shown in FIG. 1 and FIG. 2, branching Y connections 8 are arranged in the main data lines 7H to the respective control unit 5 such that each wheel speed sensor 3 arranged on the main axles H can have a signal-conducting connection both to the primary control unit 5a (during normal operation 2N) and to the secondary control unit 5b (during backup operation 2B) and can be supplied with energy thereby.

For this purpose, the primary control unit 5a has primary main terminals 9aH and the secondary control unit 5b has secondary main terminals 9bH, to which the branching main data lines 7H are respectively connected. In order to read a wheel speed sensor 3 on the main axles H and possibly to supply it with energy, the two control units 5 need to coordinate in this embodiment in order to avoid mutual influence when receiving and transmitting signals and when supplying energy via the Y connection 8.

Alternatively, two wheel speed sensors 3 may also be assigned to each wheel 4 of the main axles H, wherein each wheel speed sensor 3 of a wheel 4 is connected to another control unit 5 via an independent, unbranched main data line 7H. Instead of the branching through the Y connection 8 (in the case of only one wheel speed sensor 3 for each wheel 4), two main lines 7H which are independent of one another may therefore also run from a wheel 4 or a wheel speed sensor 3 to the respective control unit 5 (in the case of two wheel speed sensors 3 for each wheel 4). Each wheel speed sensor 3 on the main axles H may be read by only one control unit 5 in this embodiment, with the result that there is no mutual influence when receiving and transmitting signals and when supplying energy and accordingly there is also no need for any coordination between the two control units 5.

In both variants described (branched and unbranched), each of the two control units 5 (coordinated or without coordination) can resort to the wheel speeds N4 of all wheels 4 on the main axles H and can generate brake control signals BS on the basis thereof. This makes it possible to maintain driving dynamics control on the basis of the captured wheel speeds N4 of all wheels 4 of the main axles H by way of the primary control unit 5a during normal operation 2N and by way of the secondary control unit 5b that is still functioning in the event of failure of the primary control unit 5a, that is, in the event of a fault or during backup operation 2B. The secondary control unit 5b can then also still provide at least rudimentary brake functions, taking into account the driving dynamics in this redundant fallback level.

In contrast, the wheel speed sensors 3 on the additional axles Z are directly connected only to one of the two control units 5 via an additional data line 7Z, either in an axle-by-axle manner (see FIG. 1) or in a wheel-by-wheel manner (see FIG. 2). In the three-axle variant according to FIG. 2, the wheel speed sensor 3 on one (right-hand) wheel 4 of the first (single) additional axle Z1 has a signal-conducting connection only to the secondary control unit 5b via a secondary additional terminal 9bZ, for example, and the wheel speed sensor 3 on the other (left-hand) wheel 4 of the first (single) additional axle Z1 has a signal-conducting connection only to the primary control unit 5a via a primary additional terminal 9aZ, for example. In the four-axle variant according to FIG. 1, the wheel speed sensors 3 on both wheels 4 of the first additional axle Z1 have a signal-conducting connection only to the secondary control unit 5b via the secondary additional terminals 9bZ, and the wheel speed sensors 3 on both wheels 4 of the second additional axle Z2 have a signal-conducting connection only to the primary control unit 5a via primary additional terminals 9aZ. Each wheel speed sensor 3 on the additional axles Z can therefore be read and possibly supplied with energy by only one control unit 5, with the result that there is no mutual influence when receiving and transmitting signals and when supplying energy via the respective additional terminals 9Z. Accordingly, in both embodiments (FIG. 1 and FIG. 2), the control units 5 do not need to coordinate with one another with respect to these wheel speed sensors 3 on the additional axles Z. At the same time, in both embodiments (FIG. 1 and FIG. 2), each control unit 5 also reads at least one wheel speed sensor 3 on the additional axle(s) Z.

In this case, wheel speed information can also be exchanged between the two control units 5 during normal operation 2N of the brake system 2 via an exchange data line 7A. As a result, the wheel speeds N4 of all wheels 4 of the additional axles Z during fault-free operation of the brake system 2 can also be centrally evaluated, for example in the primary control unit 5a, in order to increase the information density. If a fault occurs, at least the wheel speeds N4 of the wheel speed sensors 3 on the additional axle(s) Z connected to the secondary control unit 5b can also still be resorted to during backup operation 2B of the brake system 2.

Additionally also providing wheel speed sensors 3 on the non-critical additional axle(s) Z, which are not normally taken into account by the control units 5 for driving dynamics brake pressure control, makes it possible to monitor further axles of the vehicle 1 or to determine an additional axle status ZS, with the result that the diagnostic scope in the vehicle 1 is increased overall. This is advantageous, in particular, for safe driving operation of vehicles 1 with a higher degree of automation, in particular level 3 or higher (according to SAE standard J3016).

If one of the additional axles Z is a lift axle L, for example, the wheel speed signals S3 provided by the wheel speed sensors 3 on this additional axle Z or lift axle L can be used to determine a lift axle status ZSL, that is, whether a lift axle controller 40, which ensures that the lift axle L is raised or lowered, is functioning or whether there is a mechanical defect, for example. Depending on the setting of the lift axle controller 40, it can specifically be expected that the wheels 4 on the lift axle L either do not rotate (lift axle L raised) or rotate (lift axle L lowered), the plausibility of which can be checked by evaluating the wheel speed signals S3 provided by the respective wheel speed sensors 3 on the lift axle L in the respective control unit 5, wherein the respective control unit 5 also has a signal-conducting connection to the lift axle controller 40 for this purpose, for example via the vehicle-internal data bus, in particular CAN bus.

Furthermore, the wheel speed signals S3 provided by the wheel speed sensors 3 on the respective additional axle Z can be used to determine whether there is a burst tire or another impairment at the wheel end (wheel-side end of the respective additional axle Z, for example wheel bearing, wheel hub, rim, brake disk, et cetera) if the wheel rotation behavior of the respective wheel 4 on the respective additional axle Z demonstrably changes in comparison with the expected normal case as a result of such an event. For an additional diagnosis or in order to monitor the additional axle status ZS, the determined wheel speeds N4 of the wheels 4 on the additional axles Z can therefore be compared with expected target wheel speeds N4Soll.

Therefore, there is no need for an additional control unit 5 to extend the scope of the monitoring or diagnosis of the vehicle 1 since the already existing control units 5 for monitoring and controlling the brake system 2 are resorted to. These existing control units 5 already have interfaces to wheel speed sensors 3 on the main axles H (via the main data lines 7H) and have the respective software routines for processing the wheel speed signals S3, with the result that, in order to read the wheel speed sensors 3 on the additional axles Z, it is possible to resort to the same hardware and software variant for the control unit 5 as in a vehicle 1 with a lower degree of automation, for example level 2 (for example without wheel speed sensors 3 on the additional axles Z). Apart from enabling further additional terminals 9Z on the control unit 5 and providing wheel speed sensors 3 on the respective additional axles Z, together with an additional data line 7Z, no adaptation is therefore required.

Furthermore, on account of the uniform division of the wheel speed sensors 3 on the additional axles Z among the respective control units 5, optimized wiring can be enabled if the wheel speed sensors 3 are assigned to the respective closest control units 5 that are "still free", depending on the place of construction. In addition, not all additional terminals 9Z for the extended monitoring are provided/need to be provided by (only) a single control unit 5, wherein, on account of the possibility of exchanging data between the control units 5 via the exchange data line 7A at least during normal operation 2N of the brake system 2, wheel speed information from all available wheel speed sensors 3 on the additional axles Z can nevertheless be used. In the event of a fault, it is nevertheless possible to resort to the wheel speed sensors 3 connected to the control unit 5 that is still functioning in each case.

In order to enable variable use of the control units 5 used here on the basis of this, provision is also made for the control units 5 to be parameterizable. The respective control unit 5 can switch, for each main terminal 9H and also for each additional terminal 9Z, between a first operating mode B1, which is configured for the use of a connection branched via the Y connection 8 between the control unit 5 and a wheel speed sensor 3, and a second operating mode B2, which is configured for the use of an unbranched, directly wired connection between the control unit 5 and a wheel speed sensor 3. This has the advantage that it is possible to specifically select, on the basis of the electrical connection (branched/unbranched) between the respective wheel speed sensor 3 and the respective control unit 5, which hardware components and also software routines in the respective control unit 5 are resorted to.

As already described, mutual coordination of the relevant control units 5 is needed to read the wheel speed sensors 3 on the main axles H via the Y connections 8. For this purpose, a software routine determines, according to stipulated rules, which control unit 5 may read a wheel speed sensor 3 on the respective main axle H via the respective main terminal 9H and possibly supply it with energy. As a rule, it is possible to stipulate, for example, that the primary control unit 5a is used during normal operation 2N of the brake system 2 and the secondary control unit 5b is used only in the event of a fault or during backup operation 2B of the brake system 2 at the main axles H.

In the control unit 5 used, the respective main terminal 9H is then switched to be active by the corresponding software routine, thus resorting to the hardware components in the control unit 5 which are needed to read the respective wheel speed sensor 3 on the main axle H. In the other control unit 5 which is not used, the main terminal 9H for the same wheel speed sensor 3 is switched to be passive by the corresponding software routine, as a result of which the hardware components in the control unit 5 which are needed to read the respective wheel speed sensor 3 are "disconnected" or deactivated. This makes it possible to achieve complete electrical decoupling for the relevant wheel speed sensor 3 and to avoid mutual influence when receiving and transmitting signals and when supplying energy (in the case of actively operated wheel speed sensors 3).

If no branching Y connection 8 is provided between the control unit 5 and a wheel speed sensor 3, for example in the unbranched variant with two wheel speed sensors 3 for each wheel 4 of the main axles H (not illustrated) and/or on the additional axles Z, the main terminals 9H or the additional terminals 9Z of the control units 5 can remain permanently active. Mutual influence when receiving and transmitting signals and when supplying energy (in the case of actively operated wheel speed sensors 3) is specifically not possible in that case since there is already electrical decoupling on account of the existing direct wiring. Accordingly, previous coordination via a software routine is not required either for the respective terminals 9H and 9Z of the control unit 5.

In order to therefore optimize operation, there is a switch to the first operating mode B1 in the case mentioned first (if there is a branching Y connection 8 in the main data lines 7H) for the main terminals 9H of the respectively affected control units 5. In the first operating mode B1, the control units 5 can still also coordinate with one another by virtue of the respective software routine and can determine which control unit 5 receives (no) authorization to read the respectively connected wheel speed sensor 3 and consequently switches the respective main terminal 9H to be active (passive).

In contrast, for the additional terminals 9Z of the respective control units 5, there is a switch to the second operating mode B2 since they do not require such coordination and therefore can remain permanently active. In the case of an unbranched variant with two wheel speed sensors 3 for each wheel 4 of the main axles H (not illustrated), the main terminals 9H of the respective control units 5 can also be switched to the second operating mode B2 and can therefore be switched to be permanently active.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Vehicle
2 Brake system
2a Wheel brakes
2B Backup operation of the brake system 2
2N Normal operation of the brake system 2
3 Wheel speed sensor
4 Wheels of the vehicle 1
5 Control unit
5a Primary control unit
5b Secondary control unit
7A Exchange data line
7H Main data line
7Z Additional data line
8 Y connection
9H Main terminal
9aH Primary main terminal
9bH Secondary main terminal
9Z Additional terminal
9aZ Primary additional terminal
9bZ Secondary additional terminal
20 Axle modulator
20a Control line
40 Lift axle controller
B1 First operating mode
B2 Second operating mode
BS Brake control signal
BSa Primary brake control signal
BSb Secondary brake control signal
H Main axle
Hv Front main axle
Hh Rear main axle
L Lift axle
N4 Wheel speed
N4Soll Target wheel speed
S3 Wheel speed signal
Z Additional axle
Z1 First additional axle
Z2 Second additional axle
ZS Additional axle status
ZSL Lift axle status

The invention claimed is:

1. A brake system for the electronically controlled braking of wheels on at least two main axles of a vehicle via wheel brakes of the brake system, the brake system comprising:
   a plurality of wheel speed sensors, wherein the at least two main axles and at least one additional axle have at least one of the plurality of wheel speed sensors disposed thereon for outputting wheel speed signals on a basis of determined wheel speeds of the wheels on the at least two main axles and of the wheels on the at least one additional axle;
   at least two control units for generating and outputting brake control signals, wherein the wheel brakes on the at least two main axles are configured to be controlled on a basis of the brake control signals;
   the wheel speed sensors on the at least two main axles being connected to the at least two control units via main data lines such that each of the at least two control units is configured to receive the determined wheel speeds via the wheel speed signals for each wheel on the at least two main axles to which at least one wheel speed sensor is assigned; and, each of the wheel speed sensors on the at least one additional axle being connected only to one of the at least two control units via an additional data line, and each of the at least two control units being in turn connected to at least one of the wheel speed sensors on the at least one additional axle.

2. The brake system of claim 1, wherein the at least two control units are formed by a primary control unit and a secondary control unit; the primary control unit is configured to generate and output primary brake control signals during normal operation of the brake system, and the secondary control unit is configured to generate and output secondary brake control signals during backup operation of the brake system in which the primary control unit has failed; and, the wheel brakes of the brake system are configured to be controlled on a basis of the primary brake control signals during normal operation and on a basis of the secondary brake control signals during backup operation.

3. The brake system of claim 1, wherein at least two additional axles are provided in the brake system; and, the wheel speed sensors on the at least two additional axles are uniformly divided among the at least two control units.

4. The brake system of claim 3, wherein each of the at least two control units is connected to a same number of the wheel speed sensors on the at least two additional axles via the additional data lines without one of the wheel speed sensors on the at least one additional axle being connected to more than one of the at least two control units.

5. The brake system of claim 1, wherein at least one of:

the wheel speed sensors assigned to a same additional axle are connected to a same of the at least two control units via the additional data lines for dividing the plurality of wheel speed sensors among the at least two control units in an axle-by-axle manner; and, at least a subset of the wheel speed sensors assigned to the same additional axle are connected to different ones of the at least two control units via the additional data lines for dividing at least some of the plurality of wheel speed sensors among the at least two control units in a wheel-by-wheel manner.

6. The brake system of claim 1, wherein no wheel brakes are arranged on the at least one additional axle.

7. The brake system of claim 1, wherein a wheel brake is assigned to all wheels of the at least two main axles for braking the wheels of the at least two main axles of the vehicle in a wheel-by-wheel manner.

8. The brake system of claim 1, wherein at least one of the at least two control units is configured to monitor an additional axle status on the basis of the wheel speed signals from the wheel speed sensors on the at least one additional axle; and, the additional axle status indicates whether the additional axle is being operated in a faulty or fault-free manner.

9. The brake system of claim 8, wherein the at least one additional axle is formed by a lift axle; the lift axle is configured to be raised and lowered via a lift axle controller; and, at least one of the at least two control units is configured to monitor a lift axle status by checking a plausibility of a setting of the lift axle controller on the basis of the wheel speed signals output by the wheel speed sensors on the lift axle.

10. The brake system of claim 8, wherein at least one of the at least two control units is configured to check, on the basis of the wheel speed signals output by the wheel speed sensors on the additional axle, whether a wheel speed of the wheels on the additional axle corresponds to or differs from a target wheel speed in order to determine whether the additional axle is being operated in the faulty or fault-free manner.

11. The brake system of claim 1, wherein a corresponding one of the at least two control units is configured to generate the brake control signals on the basis of the wheel speed signals from the wheel speed sensors on the at least two main axles.

12. The brake system of claim 1, wherein the at least two control units each have a main terminal for connecting the wheel speed sensor on one of the at least two main axles and an additional terminal for connecting the wheel speed sensor on one of the at least one additional axle.

13. The brake system of claim 12, wherein:

each of the plurality of wheel speed sensors connected to a corresponding one of the at least two control units via the main data line is correspondingly connected to the main terminal of the corresponding one of the at least two control units and is assigned a separate main terminal on the corresponding one of the at least two control units; and, each of the wheel speed sensors connected to the corresponding one of the at least two control units via the additional data line is connected to an own, separate additional terminal of the corresponding one of the at least two control units and/or is assigned an own, separate additional terminal on the corresponding one of the at least two control units.

14. The brake system of claim 12, wherein the main data lines each have a branching Y connection such that the corresponding one of the plurality of wheel speed sensors arranged on the at least two main axles is simultaneously connected to the at least two control units via the respective Y connection and via the corresponding ones of the main terminals.

15. The brake system of claim 12, wherein one of the wheel speed sensors arranged on the at least two main axles is connected to the corresponding one of the at least two control units via the main terminal in a directly wired manner via the main data line; and, two wheel speed sensors of the plurality of wheel speed sensors are assigned to each wheel on the at least two main axles and each of the at least two wheel speed sensors of a wheel is connected to another of the at least two control units in a directly wired manner via the main data line.

16. The brake system of claim 12, wherein the at least two control units are parameterizable and configured to switch between a first operating mode and a second operating mode for each of the main terminals and for each of the additional terminals, wherein a switch to the first operating mode occurs if a corresponding one of the main terminals or additional terminals is connected to one of the plurality of wheel speed sensors via a Y connection, and a switch to the second operating mode occurs if a corresponding one of the main terminals or additional terminals is connected to one of the plurality of wheel speed sensors in a directly wired manner.

17. The brake system of claim 1, wherein the at least two control units have a signal-conducting connection to one another via an exchange data line for exchanging signals relating to wheel speeds.

18. The brake system of claim 1, wherein the at least two control units have a signal-conducting connection to one another via an exchange data line for exchanging signals relating to wheel speeds of the at least one additional axle.

19. A method for operating a brake system, the brake system being for electronically controlled braking of wheels on at least two main axles of a vehicle via wheel brakes of the brake system, the brake system including a plurality of wheel speed sensors and at least two control units for generating and outputting brake control signals, the at least two main axles and at least one additional axle having at least one of the plurality of wheel speed sensors disposed thereon for outputting wheel speed signals on a basis of determined wheel speeds of the wheels on the at least two main axles and of the wheels on the at least one additional axle, the wheel brakes on the at least two main axles being configured to be controlled on a basis of the brake control signals, the wheel speed sensors on the at least two main axles being connected to the at least two control units via main data lines such that each of the at least two control units is configured to receive the determined wheel speeds via the wheel speed signals for each wheel on the at least two main axles to which at least one wheel speed sensor is assigned, and, each of the wheel speed sensors on the at least one additional axle being connected only to one of the at least two control units via an additional data line, and each of the at least two control units being in turn connected to at least one of the wheel speed sensors on the at least one additional axle, the method comprising:

generating and outputting the brake control signals via the at least two control units of the brake system;
  controlling the wheel brakes on the at least two main axles on a basis of the outputted brake control signals;
  outputting the wheel speed signals via the wheel speed sensors on the at least two main axles and on the at least one additional axle of the brake system, wherein the wheel speed signals are generated on a basis of the determined wheel speeds of the wheels on the at least two main axles and of the wheels on the at least one additional axle;
  receiving at each of the at least two control units the determined wheel speed via the output wheel speed signals for each wheel on the at least two main axles, to which at least one of the wheel speed sensors is assigned, and the at least two control units being configured to generate brake control signals on a basis thereof; and,
  receiving and processing via each of the at least two control units the determined wheel speeds of at least one of the wheels on the at least one additional axle via the output wheel speed signals, wherein each determined wheel speed of the wheel on the at least one additional axle is simultaneously received and processed only by one of the at least two control units.

20. The method of claim 19, wherein:
  the at least two control units include a primary control unit and a secondary control unit;
  during normal operation of the brake system, the primary control unit generates and outputs primary brake control signals on a basis of the received wheel speeds of the wheels of the at least two main axles, and the wheel brakes on the at least two main axles are controlled during the normal operation on a basis of the output primary brake control signals; and,
  during backup operation of the brake system, the secondary control unit generates and outputs secondary brake control signals on the basis of the received wheel speeds of the wheels of the at least two main axles, and the wheel brakes on the at least two main axles are controlled during the backup operation on a basis of the output secondary brake control signals.

21. A vehicle comprising the brake system of claim 1.

* * * * *